Dec. 9, 1958  T. J. KNAPP  2,863,607
QUICK DETACHABLE RAIL JOINT
Filed April 11, 1958  2 Sheets-Sheet 1
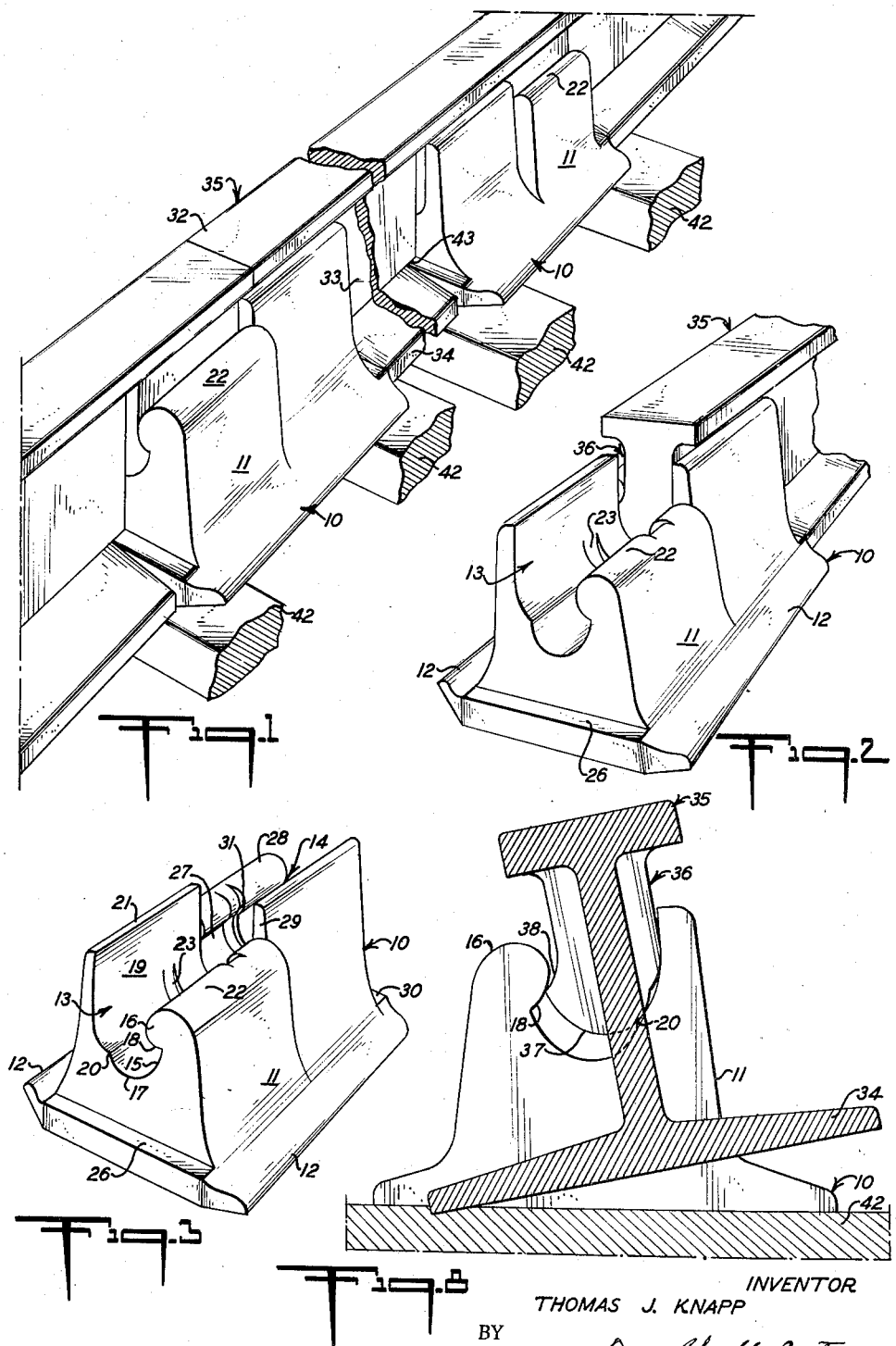
INVENTOR
THOMAS J. KNAPP
BY
Donald G. Eaton
AGENT Dec. 9, 1958  T. J. KNAPP  2,863,607
QUICK DETACHABLE RAIL JOINT
Filed April 11, 1958  2 Sheets-Sheet 2
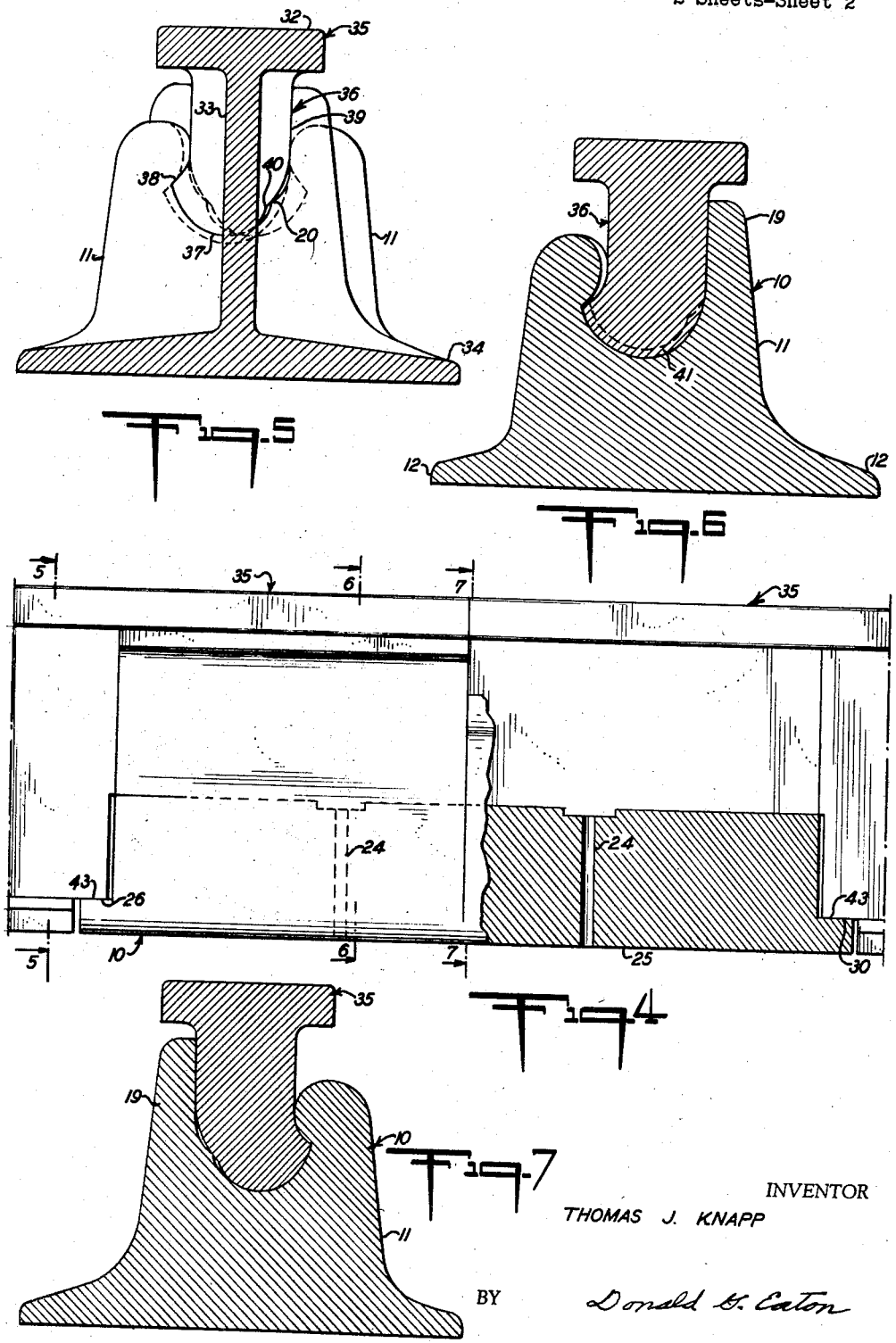
INVENTOR
THOMAS J. KNAPP
BY Donald G. Caton
AGENT

United States Patent Office 2,863,607
Patented Dec. 9, 1958

2,863,607

QUICK DETACHABLE RAIL JOINT

Thomas Jack Knapp, Bloomington, Ind.

Application April 11, 1958, Serial No. 727,958

8 Claims. (Cl. 238—187)

This invention relates to railways and more particularly to a quick detachable rail joint for securing railway rails together in end to end relationship and for facilitating the laying or removal of such rails.

Heretofore, numerous types of quick detachable rail joints have been proposed, but many of these have failed in actual service and furthermore, many of these were not actually detachable devices but required as much time and effort to utilize as the conventional fish plate joint now commonly utilized for securing rails together in end to end relationship. These fish plate joints have proven entirely satisfactory from a service standpoint, but as is well known, the use of the same and installation thereof is a time consuming process since a relatively large number of bolts and nuts must be applied and tightened, usually manually, which results in materially increasing the cost of laying or removing rails.

It is accordingly an object of the invention to provide a quick detachable rail joint which may be conveniently utilized by relatively unskilled labor and which will provide a tight satisfactory joint between adjacent rails and yet may be assembled or dis-assembled by a relatively simple and rapid operation.

A further object of the invention is the provision of a quick detachable rail joint in which the joint of the rails is effected by a relatively simple manual manipulation thereof which results in the cooperating parts of the joint becoming interlocked to securely join the rails together in end to end relationship.

A still further object of the invention is the provision of a quick detachable rail joint including a combined rail chair and female joint member which may be secured in position on the cross ties and in which the male joint member is provided on the ends of the rails to be joined there being inter-engaging means on the male and female members for preventing longitudinal movement of the rails and also for preventing movement tending to disengage the male member from the female member.

Another object of the invention is the provision of a quick detachable rail joint, including a combined rail chair and female joint member, together with male joint members formed on the ends of the rails and in which the female joint member is provided with means for automatically urging the male joint member into tight interlocking engagement with the female joint member.

A further object of the invention is the provision of a quick detachable rail joint including a combined rail chair and female joint member, as well as male joints members formed on the ends of the rails and in which the bottom flanges of the rails cooperate with the upper surfaces of the cross ties to assist in locking the joint members in inter-engaging relationship.

Further objects and advantages of the invention will be apparent from the following description taken in conjunction with the accompanying drawing wherein:

Fig. 1 is a view in perspective showing a plurality of rails joined by the quick detachable rail joint of this invention;

Fig. 2 a view in perspective showing the combined rail chair and female joint member with the end of one rail engaged therewith;

Fig. 3 a view in perspective showing the combined rail chair and female joint member;

Fig. 4 a side elevational view with parts broken away and in section for greater clarity and showing the ends of two rails joined by the combined rail chair and female joint member;

Fig. 5 a sectional view taken substantially on the line 5—5 of Fig. 4;

Fig. 6 a sectional view taken substantially on the line 6—6 of Fig. 4;

Fig. 7 a sectional view taken substantially on the line 7—7 of Fig. 4; and

Fig. 8 a sectional view showing the manner in which the cross ties cooperate with the lower flange of the rail to assist in locking the male and female joint members in inter-engaging relationship.

With continued reference to the drawing, there is shown a quick detachable rail joint constructed in accordance with this invention and which may well include a rail chair and female joint member 10 comprising an elongated block 11 having side flanges 12 to facilitate securing the block 11 to the cross ties. Upwardly opening recesses 13 and 14 are provided in the block 11 and extend longitudinally from each end thereof to a point substantially midway of the length of the block 11. One sidewall 15 of the recess 13 terminates at the upper edge at a longitudinal inwardly projecting bead 16 overhanging the recess 13. The recess 13 is also provided with a curved bottom wall 17 which merges into the sidewall 15 and terminates at the lower surface of the bead 16 to provide an abutment 18. The opposite sidewall 19 of the recess 13 is provided with a substantially flat inner surface which merges into the curved bottom wall 17 and between the sidewall 19 and the bottom wall 17 there is provided a longitudinal inwardly projecting ridge 20, the purpose of which will be later described. It is also to be noted that the sidewall 19 of the recess 13 terminates in an upper edge 21 disposed substantially above the upper edge 22 of the sidewall 15.

Also provided in the bottom wall 17 and sidewalls 15 and 19 is a transverse groove 23 which as shown in Fig. 5, is provided with a drain hole 24 extending downwardly through the bottom wall 25 of the block 11 to permit drainage of any moisture which may collect in the recess 13. The block 11 is also provided on one end thereof with a rail web engaging shoulder 26, the purpose of which will be later described.

In a similar manner, the recess 14 at the opposite end of the block 11 is provided with a sidewall 27 terminating at the upper edge in a longitudinal inwardly projecting bead 28 overhanging the recess 14 and a curved bottom wall and flat opposite sidewall 29 are formed in the same manner as described above in connection with the recess 13, there also being a longitudinal ridge between the sidewall and the bottom wall similar to the ridge 20 in the recess 13. It is to be noted, however, that the recess 14 is reversed with respect to the recess 13 or in other words, the sidewalls 27 and 29 are on opposite sides of the block 11 from the sidewalls 15 and 19 of the recess 13. A rail web engaging shoulder 30 is also provided on the end of the block 11 opposite from the shoulder 26, as clearly shown in Fig. 3.

The rail joint of this invention may be utilized with conventional railway rails which have been modified at each end thereof and such rails may well include the usual upper wheel engaging flange 32, a connecting web 33 and a lower cross tie engaging flange 34, as best shown in Figs. 1, 4, 5 and 6, a rail 35 may have one end thereof modified by removing a portion of the lower flange 34 and by building up the web 33 to provide a male joint member 36. The male joint member 36, projects downwardly from the upper flange 32 of the rail 35 and is of a configuration which is complementary to the configuration of the recesses in the block 11. Such male joint member 36 may be provided with a curved bottom side 37 terminating in a shoulder 38 for engaging the shoulder 18 in the recess 13 of the block 11 and the opposite side 39 of the male joint member 36 is substantially flat to engage the flat sidewall 19 of the recess 13. A longitudinal indentation 40 is provided in the male joint member 36 between the flat side 39 and the curved lower part 37 and this indentation 40 serves to receive the ridge 20 when the male and female joint members are in inter-engaging relationship as clearly shown in Fig. 5. As best shown in Fig. 6, the male joint member 36 is provided with a transverse rib or portion 41 for engaging the transverse groove 23 in the recess 13 in order to prevent longitudinal movement of the rail 35 with respect to the block 11.

As best shown in Fig. 1, the combined rail chairs and female joint members 10 may be secured to cross ties 42 in any suitable manner as by the conventional railroad spikes, not shown, and thereafter the rail 35, as well as succeeding rails may be conveniently joined together by the use of such rail chairs and female joint members. As shown in Fig. 8, the rail 35 is tilted sideways to engage the male joint member 36 in the appropriate female recess 13 or 14 and the rail 35 is rotated to bring the joint members into full inter-engaging relationship. This inter-engagement is facilitated by engagement of the ridge 20 with the curved lower portion 37 of the male joint member 36 and the ridge 20 acts as a cam to move the shoulder 38 of the male joint member 36 transversely into underlying relationship to the shoulder 18 on the bead 16. It is also to be noted, as shown in Fig. 8, that the edge of the lower flange 34 of the rail 35 engaged the upper surface of the cross ties 42 prior to full engagement of the male joint member 36 with the recess in the block 11 and this provides in effect, a snap action which requires that sufficient force be exerted in rotating the rail 35 to move the edge of the lower flange 34 in engagement with the cross tie 42 to a position substantially parallel therewith, at which time, the joint members are fully inter-engaged and furthermore, at this time the engagement of the lower flange 34 with the cross ties 42 will operate to effectively retain the joint members in engagement. Furthermore, a portion of the load on the combined chair and female joint member 10 is taken by the end 43 of the web 33 engaging the appropriate shoulder 26 or 30 on the chair member 10.

A plurality of rails laid end to end may be conveniently joined together by the quick detachable joint described above and furthermore, such rails may be quickly removed by simply rotating the same in the reverse direction which serves to disengage the male joint member 36 from the female joint member thereby permitting removal of the rails. The rails are securely held against movement relative to the rail chair 10 by reason of the inter-engagement of the joint member and the engagement of the flange 34 with the cross ties 42 and longitudinal movement of the rails with relation to the chair members 10 is, of course, prevented by engagement of the ribs 41 with the grooves 23 in the female recesses of the chair members 10. It is also to be noted, that the combined chair and female joint members 10 must be made in opposite sets in that, the recesses in such members are reversed and consequently, the chair members must be so formed as to accommodate the appropriate rotation of the rail to assemble the same therewith.

It will be seen that by the above described invention, there has been provided a relatively simple, yet highly effective quick detachable rail joint which may be conveniently and economically manufactured and utilized and which will provide a firm and secure joint between adjacent rails and which will materially expedite installation or removal of such rails.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A quick detachable joint for coupling together the adjacent ends of railway rails, said joint including a combined rail chair and female joint member and mating male joint members on the opposite ends of each rail, said chair and female joint member comprising an elongated block having side flanges to facilitate securing said block to a cross tie, an upwardly opening longitudinal recess in said block extending from each end to a point substantially midway of the length thereof, one sidewall of said recess terminating at the upper edge in a longitudinal inwardly projecting bead overhanging said recess, a curved bottom wall in said recess merging into said one sidewall and terminating at the lower surface of said bead to provide an abutment, the opposite sidewall having a substantially flat inner surface with the upper edge disposed above said bead, said flat inner surface merging into said bottom wall and a longitudinal inwardly projecting ridge between said flat surface and said bottom wall, a transverse groove in said bottom wall, said one sidewall and a portion of said flat surface, a drain hole communicating with said groove and extending through the bottom of said block and a rail web engaging shoulder on each end of said block below said recess, the recesses in each end of said block having the same cross sectional configuration but being reversed with respect to each other, said mating male joint member comprising a section projecting downwardly from the upper flange of the rail at each end, said section having a configuration complementary to that of said recess with a portion for engaging said transverse groove and a longitudinal indentation in said section for receiving said ridge, the web of said rail extending outwardly of the lower flange for engaging said web engaging shoulder, whereby upon insertion of said section through the top opening of said recess at an angle and upon rotation of said rail, said section will be urged into mating engagement by the action of said ridge and upon complete engagement of said section with said recess, said ridge will be received in said indentation and together with said web engaging shoulder and the engagement of the lower rail flange with the cross ties will provide a self-locking quick detachable rail joint.

2. A quick detachable joint for coupling together the adjacent ends of railway rails, said joint including a combined rail chair and female joint member and mating male joint members on the opposite ends of each rail, said chair and female joint member comprising an elongated block having side flanges to facilitate securing said block to a cross tie, an upwardly opening longitudinal recess in said block extending from each end to a point substantially midway of the length thereof, one sidewall of said recess terminating at the upper edge in a longitudinal inwardly projecting bead overhanging said recess, a curved bottom wall in said recess merging into said one side wall and terminating at the lower surface of said bead to provide an abutment, the opposite sidewall having a substantially flat inner surface with the upper edge disposed above said bead, said flat inner surface merging into said bottom wall and a longitudinal inwardly projecting ridge between said flat surface and said bottom wall, a transverse groove in said bottom wall, said one sidewall and a portion of said flat surface, a rail web engaging shoulder on each end of said block below said recess, the recesses in each end of said block having the same cross sectional configuration but being reversed with respect to each other, said mating male joint member comprising a section projecting downwardly from the upper flange of the rail at each end, said section having a configuration complementary to that of said recess with a portion for engaging said transverse groove and a longitudinal indentation in said section for receiving said ridge, the web of said rail extending outwardly of said lower flange for engaging said web engaging shoulder, whereby upon insertion of said section through the top opening of said recess at an angle and upon rotation of said rail, said section will be urged into mating engagement by the action of said ridge and upon complete engagement of said section with said recess, said ridge will be received in said indentation and together with said web engaging shoulder and the engagement of the lower rail flange with the cross ties will provide a self-locking quick detachable rail joint.

3. A quick detachable joint for coupling together the adjacent ends of railway rails, said joint including a combined rail chair and female joint member and mating male joint members on the opposite ends of each rail, said chair and female joint member comprising an elongated block having side flanges to facilitate securing said block to a cross tie, an upwardly opening longitudinal recess in said block extending from each end to a point substantially midway of the length thereof, one sidewall of said recess terminating at the upper edge in a longitudinal inwardly projecting bead overhanging said recess, a curved bottom wall in said recess merging into said one sidewall and terminating at the lower surface of said bead to provide an abutment, the opposite sidewall having a substantially flat inner surface with the upper edge disposed above said bead, said flat inner surface merging into said bottom wall and a longitudinal inwardly projecting ridge between said flat surface and said bottom wall, a transverse groove in said bottom wall, said one sidewall and a portion of said flat surface, the recesses in each end of said block having the same cross sectional configuration but being reversed with respect to each other, said mating male joint member comprising a section projecting downwardly from the upper flange of the rail at each end, said section having a configuration complementary to that of said recess with a portion for engaging said transverse groove and a longitudinal indentation in said section for receiving said ridge, whereby upon insertion of said section through the top opening of said recess at an angle and upon rotation of said rail, said section will be urged into mating engagement by the action of said ridge and upon complete engagement of said section with said recess, said ridge will be received in said indentation and together with the engagement of the lower rail flange with cross ties will provide a self-locking quick detachable rail joint.

4. A quick detachable joint for coupling together the adjacent ends of railway rails, said joint including a combined rail chair and female joint member and mating male joint members on the opposite ends of each rail, said chair and female joint member comprising an elongated block having side flanges to facilitate securing said block to a cross tie, an upwardly opening longitudinal recess in said block extending from each end to a point substantially midway of the length thereof, one sidewall of said recess terminating at the upper edge in a longitudinal inwardly projecting bead overhanging said recess, a curved bottom wall in said recess merging into said one sidewall and terminating at the lower surface of said bead to provide an abutment, the opposite sidewall having a substantially flat inner surface with the upper edge disposed above said bead, said flat inner surface merging into said bottom wall and a longitudinal inwardly projecting ridge between said flat surface and said bottom wall, the recesses in each end of said block having the same cross sectional configuration but being reversed with respect to each other, said mating male joint member comprising a section projecting downwardly from the upper flange of the rail at each end, said section having a configuration complementary to that of said recess and a longitudinal indentation of said section for receiving said ridge, whereby upon insertion of said section through the top opening of said recess at an angle and upon rotation of said rail, said section will be urged into mating engagement by the action of said ridge and upon complete engagement of said section with said recess, said ridge will be received in said indentation and together with the engagement of the lower rail flange with the cross ties will provide a self-locking quick detachable rail joint and means for preventing relative longitudinal movement of said rail and said female joint member.

5. A quick detachable joint for coupling together the adjacent ends of railway rails, said joint including a combined rail chair and female joint member and mating male joint members on the opposite ends of each rail, said chair and female joint member comprising an elongated block having side flanges to facilitate securing said block to a cross tie, an upwardly opening longitudinal recess in said block extending from each end to a point substantially midway of the length thereof, one side wall of said recess terminating at the upper edge in a longitudinal inwardly projecting bead overhanging said recess, a curved bottom wall in said recess merging into said one side wall and terminating at the lower surface of said bead to provide an abutment, the opposite sidewall having a substantially flat inner surface, said flat inner surface merging into said bottom wall and a longitudinal inwardly projecting ridge between said flat surface and said bottom wall, the recesses in each end of said block having the same cross sectional configuration but being reversed with respect to each other, said mating male joint member comprising a section projecting downwardly from the upper flange of the rail at each end, said section having a configuration complementary to that of said recess and a longitudinal indentation in said section for receiving said ridge, whereby upon insertion of said section through the top opening of said recess at an angle and upon rotation of said rail, said section will be urged into mating engagement by the action of said ridge and upon complete engagement of said section with said recess, said ridge will be received in said indentation and together with the engagement of the lower rail flange with the cross ties will provide a self-locking quick detachable rail joint and means for preventing relative longitudinal movement between said rail and said female joint member.

6. A quick detachable joint for coupling together the adjacent ends of railway rails, said joint including a combined rail chair and female joint member and mating male joint members on the opposite ends of each rail, said chair and female joint member comprising an elongated block, an upwardly opening longitudinal recess in said block extending from each end to a point substantially midway of the length thereof, one sidewall of said recess terminating at the upper edge in a longitudinal inwardly projecting bead overhanging said recess, a curved bottom wall in said recess merging into said one sidewall and terminating at the lower surface of said bead to provide an abutment, the opposite sidewall having a substantially flat inner surface, said flat inner surface merging into said bottom wall and a longitudinal inwardly projecting ridge between said flat surface and said bottom wall, the recesses in each end of said block having the same cross sectional configuration but being reversed with respect to each other, said mating male joint member comprising a section projecting downwardly from the upper flange of the rail at each end, said section having a configuration complementary to that of said recess and a longitudinal indentation in said section for receiving said ridge, whereby upon insertion of said section through the top opening of said recess at an angle and upon rotation of said rail, said section will be urged into mating engagement by the action of said ridge and upon complete engagement of said section with said recess, said ridge will be received in said indentation and together with the engagement of the lower rail flange with the cross ties will provide a self-locking quick detachable rail joint and means for preventing relative longitudinal movement between said rail and said female joint member.

7. A quick detachable joint for coupling together the adjacent ends of railway rails, said joint including a combined rail chair and female joint member and mating male joint members on the opposite ends of each rail, said chair and female joint member comprising an elongated block, an upwardly opening longitudinal recess in said block extending from each end to a point substantially midway of the length thereof, one sidewall of said recess terminating at the upper edge in a longitudinal inwardly projecting bead overhanging said recess, a curved bottom wall in said recess merging into said one sidewall and terminating at the lower surface of said bead to provide an abutment, the opposite sidewall having a substantially flat inner surface, said flat inner surface merging into said bottom wall and a longitudinal inwardly projecting ridge between said flat surface and said bottom wall, the recesses in each end of said block having the same cross sectional configuration, said mating male joint member comprising a section projecting downwardly from the upper flange of the rail at each end, said section having a configuration complementary to that of said recess and a longitudinal indentation in said section for receiving said ridge, whereby upon insertion of said section through the top opening of said recess at an angle and upon rotation of said rail, said section will be urged into mating engagement by the action of said ridge and upon complete engagement of said section with said recess, said ridge will be received in said indentation and together with the engagement of the lower rail flange with the cross ties will provide a self-locking quick detachable rail joint and means for preventing relative longitudinal movement between said rail and said female joint member.

8. A quick detachable joint for coupling together the adjacent ends of railway rails, said joint including a combined rail chair and female joint member and mating male joint members on the opposite ends of each rail, said chair and female joint member comprising an elongated block, an upwardly opening longitudinal recess in said block extending from each end to a point substantially midway of the length thereof, one sidewall of said recess terminating at the upper edge at a longitudinal inwardly projecting bead overhanging said recess, a curved bottom wall in said recess merging into said one sidewall and terminating at the lower surface of said bead to provide an abutment, the opposite sidewall having a substantially flat inner surface, said flat inner surface merging into said bottom wall and a longitudinal inwardly projecting ridge between said flat surface and said bottom wall, the recesses in each end of said block having the same cross sectional configuration, said mating male joint member comprising a section projecting downwardly from the upper flange of the rail at each end, said section having a configuration complementary to that of said recess and a longitudinal indentation in said section for receiving said ridge, whereby upon insertion of said section through the top opening of said recess at an angle and upon rotation of said rail, said section will be urged into mating engagement by the action of said ridge and upon complete engagement of said section with said recess, said ridge will be received in said indentation and together with the engagement of the lower rail flange with the cross ties will provide a self-locking quick detachable rail joint.

No references cited.